United States Patent [19]

Marino et al.

[11] Patent Number: 4,549,677

[45] Date of Patent: Oct. 29, 1985

[54] CASTING OF ALUMINIUM-KILLED STEELS

[75] Inventors: Emilio Marino; Aldo Ramacciotti, both of Rome, Italy

[73] Assignee: Centro Sperimentale Metallurgico S.p.A., Rome, Italy

[21] Appl. No.: 500,305

[22] Filed: Jun. 2, 1983

[30] Foreign Application Priority Data

Jul. 5, 1982 [IT] Italy .............................. 48757 A/82

[51] Int. Cl.$^4$ ............................................. B22D 41/08
[52] U.S. Cl. .................................... 222/591; 501/123
[58] Field of Search ............... 222/591, 594, 566, 606; 164/335, 437; 501/123

[56] References Cited

U.S. PATENT DOCUMENTS 3,523,804 8/1970 Fukatsu et al. ...................... 106/58
3,540,899 11/1970 Alper et al. ............................ 106/58

FOREIGN PATENT DOCUMENTS 0071860 5/1982 Japan .................................. 222/591

Primary Examiner—Joseph J. Rolla
Assistant Examiner—Nils E. Pedersen
Attorney, Agent, or Firm—Young & Thompson

[57] ABSTRACT

A nozzle for the casting of aluminium-killed steel, which is prepared from pellets obtained by mixing 90–99% $Ca(OH)_2$, with at least one compound selected from the metal oxides $Fe_2O_3$, $Al_2O_3$ and $TiO_2$ and the chlorides $CaCl_2$, NaCl and LiCl, in quantities between 1 and 10%, the mixture being pelletized, dried at 100°–150° C. and baked at 800°–1500° C., grounded and screened, the screened material then being further mixed with at least one compound selected from among the metallic oxides $Fe_2O_3$, $Al_2O_3$, $TiO_2$, $ZrO_2$, and $Cr_2O_3$ and $MoO_3$ and the chlorides $CaCl_2$, NaCl and LiCl in quantities between 3 and 20% by weight, as well as with organic binders and carriers such as oil, paraffin, petroleum, lower alcohols and resins in quantities between 1 and 5%. The mix is pressed in molds at 500–1500 kg/cm$^2$ and baked at 1500°–1800° C., the body thus obtained then being vacuum-impregnated with molten pitch and cooked at about 700° C. in a reducing atmosphere.

1 Claim, No Drawings

CASTING OF ALUMINIUM-KILLED STEELS

SUMMARY

The improvement consists in the use of calcium oxide based nozzles for ladles and for tundishes in connection with the casting of aluminium-killed steels which, as is known, suffer from castability problems, especially in continuous casting, owing to blockage of the nozzles essentially by alumina.

DESCRIPTION

The present invention relates to an improvement in the casting of aluminium-killed steels. More precisely, the improvement concerns the adoption of calcium-oxide based nozzles, especially in connection with the continuous casting of these types of steel.

Hitherto there have been difficulties in casting aluminium-killed steels which become more and more serious in continuous casting, owing to the fact that alumina is deposited in the nozzle, completely blocking it within the space of a few minutes.

To appreciate fully the gravity of this situation it is necessary to provide a brief outline of the situation concerning the continuous casting process and plant, where the problem is felt most strongly.

Liquid steel is poured into a ladle where it is subjected to various treatments, including killing. The ladle is then transported to the continuous casting plant, consisting of one or more casting machines. The steel is teemed from the ladle through a nozzle, into a vessel called tundish, which is designed to distribute the steel to the various casting machines, though a number of holes in its bottom. Nozzles made of highly-resistant refractories are inserted in these holes. One of the functions of the nozzles is to ensure a regular flow of liquid steel to the casting machines which have a specific casting rate. It is evident, therefore, that the outflow section of the nozzles must remain as constant as possible during the whole casting time. It is equally evident, too, that damage will occur if the nozzle blocks, since the steel will remain in the tundish and ladle and must either be teemed by other means or else it solidifies and has to go to scrap.

The practices adopted hitherto to avoid this difficulty involve the construction of nozzles of appropriate shape through which argon is passed, or the addition of lime to the liquid steel to prevent blockages occurring, or else steps have to be taken to complete the casting solely by removing the blockage either by mechanical means or by injecting oxygen.

However, these measures are not fully satisfactory, since they often do not do all they are intended to do. As already indicated, the problems are particularly marked in continuous casting, so from this point on reference will be made to this technique, it being clearly understood, however that the present invention also extends to other casting techniques.

The aim of this invention is to overcome these difficulties in a simple, economic manner, by supplying a nozzle made of a well-known material that has never been used for this purpose.

Calcium oxide is an excellent refractory material but it suffers from the drawback of being extremely sensitive to moisture, with which it forms calcium hydroxide. This transformation detracts from the physical soundness of the refractory product. For this reason the calcium oxide is often treated with other metallic oxides of the $R_xO_y$ type (such as $Fe_2O_3$, $Al_2O_3$, $TiO_2$ ...) and/or with saline phases ($CaCl_2$, $NaCl$), which tend to inhibit hydration. The calcareous material or the hydrated lime mixed with these additives, is pelletized and then calcined at $T=800°-1600°$ C.; the clinker thus obtained is then further treated with other oxides of the type just indicated and with binders of various kinds, especially pitch, paraffin waxes, resins, etc.; with this mixture the desired product is prepared by moulding at pressures around 500–1500 kg/cm$^2$ followed by baking at high temperature.

After cooling, the body is vacuum impregnated with molten pitch and then coked in a reducing atmosphere. Products made in this manner have good hot strength and hydration resistance.

In the steelmaking industry, calcium-oxide materials of this kind are used in the preparation of linings for roofs and floors of electric furnaces and for ladles, but as far as we can ascertain, they have never been used for making nozzles. The reasons for this may be:

existence of other stronger refractories which have no hydration problems, such as high-alumina materials, or those based on zirconium silicates, or mullites, or aluminium silicates and so on the relative novelty of the problem of continuous casting of aluminium-killed steels the fact that aluminium with calcium forms aluminates compounds which either have a high melting point, when the aluminium content is high, thus still causing blockage, or have a low melting point, when the aluminium content is low, and could thus cause erosion of the nozzle.

Surprisingly the use of calcium-oxide based nozzles in the continuous casting of aluminium-killed steels has given excellent results, enabling casting runs to be performed lasting at least 4–8 times those possible with nozzles made of other materials, without any difficulties.

Pilot-plant tests show that while conventional nozzles blocked after between 5 and 10 minutes, casting runs lasting 40–45 minutes could be made with calcium-oxide based nozzles without any obstruction. It should be noted, moreover, that the duration of the casting run was limited to 40–45 minutes solely by the capacity of the melting furnace on the pilot plant.

From these data it is reasonable to presume that under works conditions, too, such times can certainly be matched and even improved upon.

Regarding the physical strength of the calcium-oxide nozzles as per the present invention, no drawbacks due to hydration have been encountered. Of course, since the material is easily hydrated, the nozzles must be protected during shipment and storage by closing them in air-tight containers. However, because of the protective treatments described below, no difficulties have been encountered during use.

The other possible cause of physical failure, namely erosion of the nozzle owing to the formation of low-melting compounds with the aluminium, has not adversely affected casting operations; in fact there has been no marked increase in the outflow section of the nozzles used in the trails.

For the purpose of exemplification several indications on the operations involved in the preparation of nozzles as per this invention are given below.

Calcium oxide amounting to between 90 and 99% of the total weight of solids, is mixed with at least one compound selected from the metallic oxides $Fe_2O_3$, $Al_2O_3$ and $TiO_2$ and the chlorides $CaCl_2$, NaCl and LiCl, in quantities between 1 and 10%. The mixture is treated with sufficient water to permit the production of pellets that are first dried at 100°–150° C. and then baked at 800°–1600° C.

The additives, oxides and/or chlorides, and the high baking temperatures are designed to favour the growth of CaO grains, thus rendering the structure of the product more dense, so it will be more resistant to hydration. The pellets thus obtaind are grounded and screened. The screened material is again treated by mixing with between 3 and 20% by weight of at least one compound selected from the metal oxides $Fe_2O_3$, $Al_2O_3$, $TiO_2$, $ZrO_2$, $Cr_2O_3$ and $MoO_3$ and the chlorides $CaCl_2$, NaCl and LiCl, and with organic binders and carriers such as oil, paraffin, petroleum, lower alcohols and resins in quantities between 1 and 5%.

The mixture is pressed in moulds at 500–1500 kg/cm$^2$ and baked at 1500°–1800° C. The bodies thus obtained are vacuum-impregnated with molten pitch and coked at about 700° C. in a reducing atmosphere. The products are highly resistant to hydration and are perfectly suitable for use as nozzles for the continuous casting of aluminium-killed steels, as specified above.

Not even the passage of high-temperature steel at high flow rates through the nozzles causes any significant wear problems.

We claim:

1. A nozzle for the casting of aluminium-killed steel, which is prepared from pellets obtained by mixing 90–99% $Ca(OH)_2$, with at least one compound selected from the metal oxides $Fe_2O_3$, $Al_2O_3$ and $TiO_2$ and the chlorides $CaCl_2$, NaCl and LiCl, in quantities between 1 and 10%, the mixture being pelletized, dried at 100°–150° C. and baked at 800°–1600° C., grounded and screened, the screened material then being further mixed with at least one compound selected from among the metallic oxides $Fe_2O_3$, $Al_2O_3$, $TiO_2$, $ZrO_2$, $Cr_2O_3$ and $MoO_3$ and the chlorides $CaCl_2$, NaCl and LiCl in quantities between 3 and 20% by weight, as well as with organic binders and carriers such as oil, paraffin, petroleum, lower alcohols and resins in quantities betweel 1 and 5%; said mix is pressed in molds at 500–1500 kg/cm$^2$ and baked at 1500°–1800° C., the body thus obtained then being vacuum-impregnated with molten pitch and cooked at about 700° C. in a reducing atmosphere.

* * * * *